(12) United States Patent
Staggs

(10) Patent No.: US 7,546,849 B2
(45) Date of Patent: Jun. 16, 2009

(54) ROTATING BONDED VALVE ASSEMBLY

(75) Inventor: Mark A. Staggs, McAllester, OK (US)

(73) Assignee: National Oilwell Varco, L.P., Houston, TX (US)

( * ) Notice: Subject to any disclaimer, the term of this patent is extended or adjusted under 35 U.S.C. 154(b) by 518 days.

(21) Appl. No.: 10/906,309

(22) Filed: Aug. 22, 2005

(65) Prior Publication Data

US 2007/0039652 A1    Feb. 22, 2007

(51) Int. Cl.
*F16K 15/06* (2006.01)
*F16K 25/04* (2006.01)

(52) U.S. Cl. .................. 137/540; 137/516.29; 251/337
(58) Field of Classification Search ................. 137/540, 137/516.27, 516.29; 251/337
See application file for complete search history.

(56) References Cited

U.S. PATENT DOCUMENTS

| 1,523,910 | A | * | 1/1925 | Sims | ........................... 137/331 |
|---|---|---|---|---|---|
| 1,819,538 | A | * | 8/1931 | Boynton | ...................... 137/155 |
| 1,902,577 | A | * | 3/1933 | Oakley | ........................ 137/243 |
| 1,939,128 | A | * | 12/1933 | Meyer | .................... 137/543.13 |
| 2,640,677 | A | * | 6/1953 | Craven | ....................... 137/332 |
| 2,810,397 | A | * | 10/1957 | Olson et al. | ............. 137/540.11 |
| 2,949,127 | A | * | 8/1960 | Malina | ................... 137/516.29 |
| 2,977,974 | A | * | 4/1961 | Browne | ................. 137/543.13 |
| 3,157,191 | A | * | 11/1964 | Garrett et al. | ............... 137/540 |
| 3,827,451 | A | | 8/1974 | Roob | |
| 3,841,520 | A | * | 10/1974 | Bryant et al. | ................ 137/517 |
| 3,937,249 | A | * | 2/1976 | Suey | ..................... 137/543.13 |
| 4,067,358 | A | * | 1/1978 | Streich | .................. 137/624.13 |
| 5,052,435 | A | * | 10/1991 | Crudup et al. | ......... 137/516.29 |
| 5,170,991 | A | | 12/1992 | Heil | |

* cited by examiner

*Primary Examiner*—John Rivell
(74) *Attorney, Agent, or Firm*—Conley Rose, P.C.

(57) ABSTRACT

Apparatus and methods for constructing a valve assembly comprising an anti-friction ring. The anti-friction ring allows a closure member in the valve assembly to more freely rotate during operation of the valve assembly. Consequently, the closure member strikes a sealing member in different rotational positions during repetitive cycling of the valve assembly.

20 Claims, 6 Drawing Sheets

ROTATING BONDED VALVE ASSEMBLY

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

The present invention relates generally to methods and apparatus for controlling flow in a pump. More particularly, the present invention relates to suction and discharge valves for reciprocating pumps used to pump abrasive fluids.

Suction and discharge valves are used in reciprocating pumps to control the flow of fluid into and out of the cylinders in which the fluid is pressurized. Reciprocating pumps are used in various operations to pressurize an often abrasive slurry mixture of solids and liquids. For example, reciprocating pumps are used in drilling operations to pressurize a slurry mixture of solids and liquids known as drilling mud to the bottom of a hole drilled into the earth. The pressurized mud is used to lubricate and cool a downhole drill bit as well as to carry loosened sediment and rock cuttings back to the surface. At the surface, the cuttings and sediment are removed from the returning drilling mud for examination and the filtered drilling mud is able to be reused. In many cases, highly abrasive particles are present in the fluids that are being pumped through the system.

Because of these highly abrasive components, valves and seals of reciprocating pumps must be designed to resist harsh abrasion, while maintaining positive sealing action and withstanding high operating pressures. Due to the abrasive and corrosive nature of most drilling fluids, these valves have a finite service life and must be replaced when the leakage rate increases to a point that the pump will not maintain satisfactory pressure for the drilling conditions. These valves and seats normally fail due to a deterioration of the elastomer sealing element of the valve, erosion cause by fluid cutting of the valve and seat metal contact surfaces or a combination of these two. Because the maintenance of these valves is a time consuming and expensive process, valves having an increased service life are desirable.

Thus, there remains a need to develop methods and apparatus for suction and discharge valves, which overcome some of the foregoing difficulties while providing more advantageous overall results.

SUMMARY OF THE PREFERRED EMBODIMENTS

The embodiments of the present invention are directed toward methods and apparatus for increasing the service life of a valve assembly. More specifically, embodiments of the present invention comprise an anti-friction ring which allows a closure member to more freely rotate during operation of the valve assembly. Consequently, the closure member strikes a sealing member in different rotational positions during repetitive cycling of the valve assembly.

Thus, the present invention comprises a combination of features and advantages that enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENTS

Figure 1:
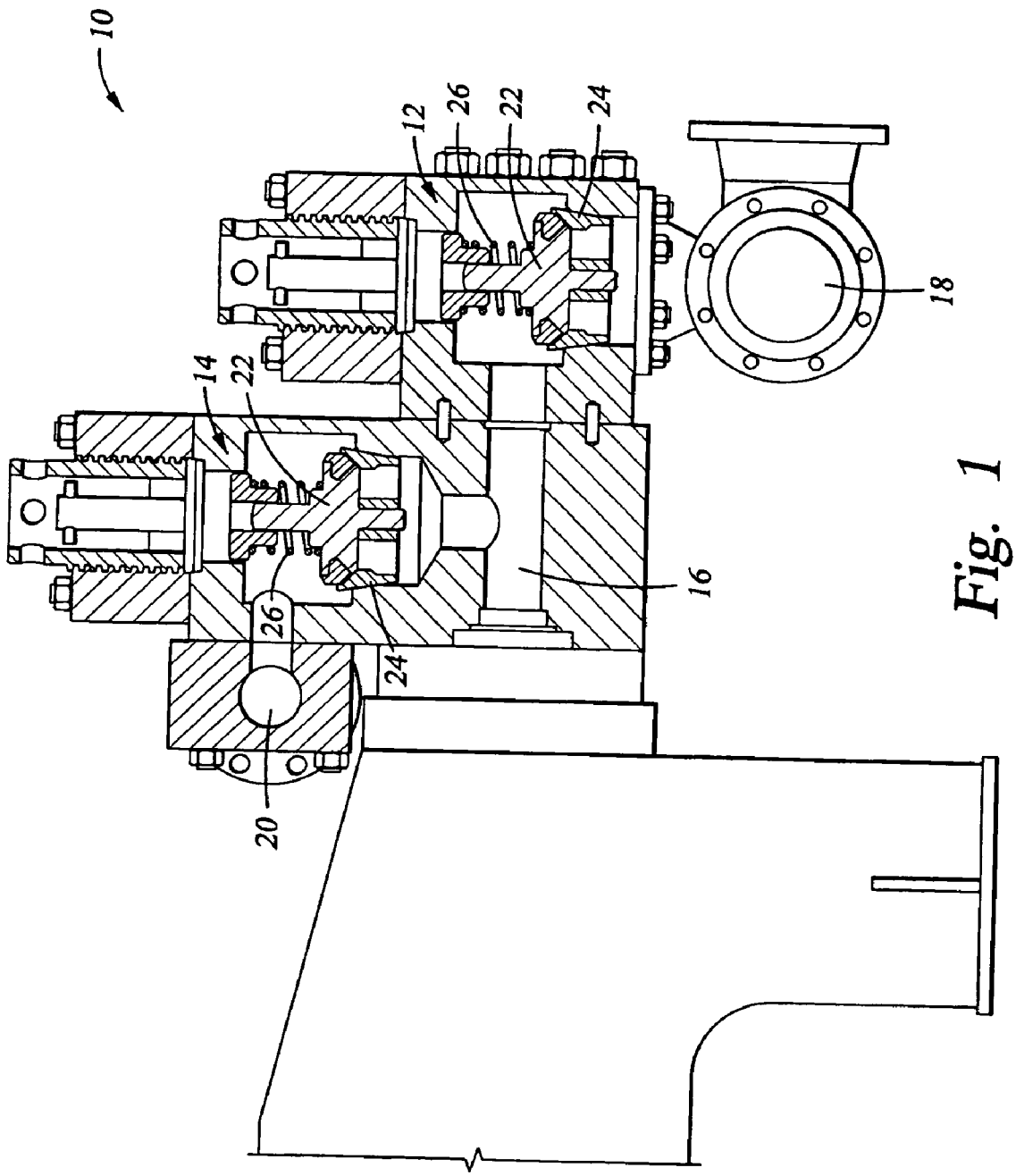
FIG. 1 is a partial sectional view showing a pump assembly constructed in accordance with embodiments of the invention.

Referring now to FIG. 1, pump fluid-end assembly 10 comprises suction valve 12 and discharge valve 14 that are connected to a piston and cylinder (not shown) via conduit 16. Suction valve 12 is connected to fluid supply 18. Discharge valve 14 is connected to fluid outlet 20. Each valve 12, 14 comprises a closure member 22 that is urged into sealing engagement with a sealing member 24 by a biasing member 26. Valves 12 and 14 are opened by pressure acting on closure member 22 so as to compress biasing member 26 and move the closure member out of engagement with sealing member 26. Thus, each valve 12 and 14 only allows flow in one direction through the valve and are arranged such that suction valve 12 allows fluid to flow into conduit 16 and discharge valve 14 allows fluid to flow out of conduit 16.

As the piston moves and expands the volume within the cylinder, discharge valve 14 closes and suction valve 12 opens so that fluid flows from fluid supply 18 into conduit 16. The piston then reverses, thus increasing the pressure within conduit 16 so that suction valve 12 closes and discharge valve 14 opens so as to allow fluid to flow into fluid outlet 20. The cycle repeats, often at a high cyclic rate, as fluid is being pumped.

Figure 2:
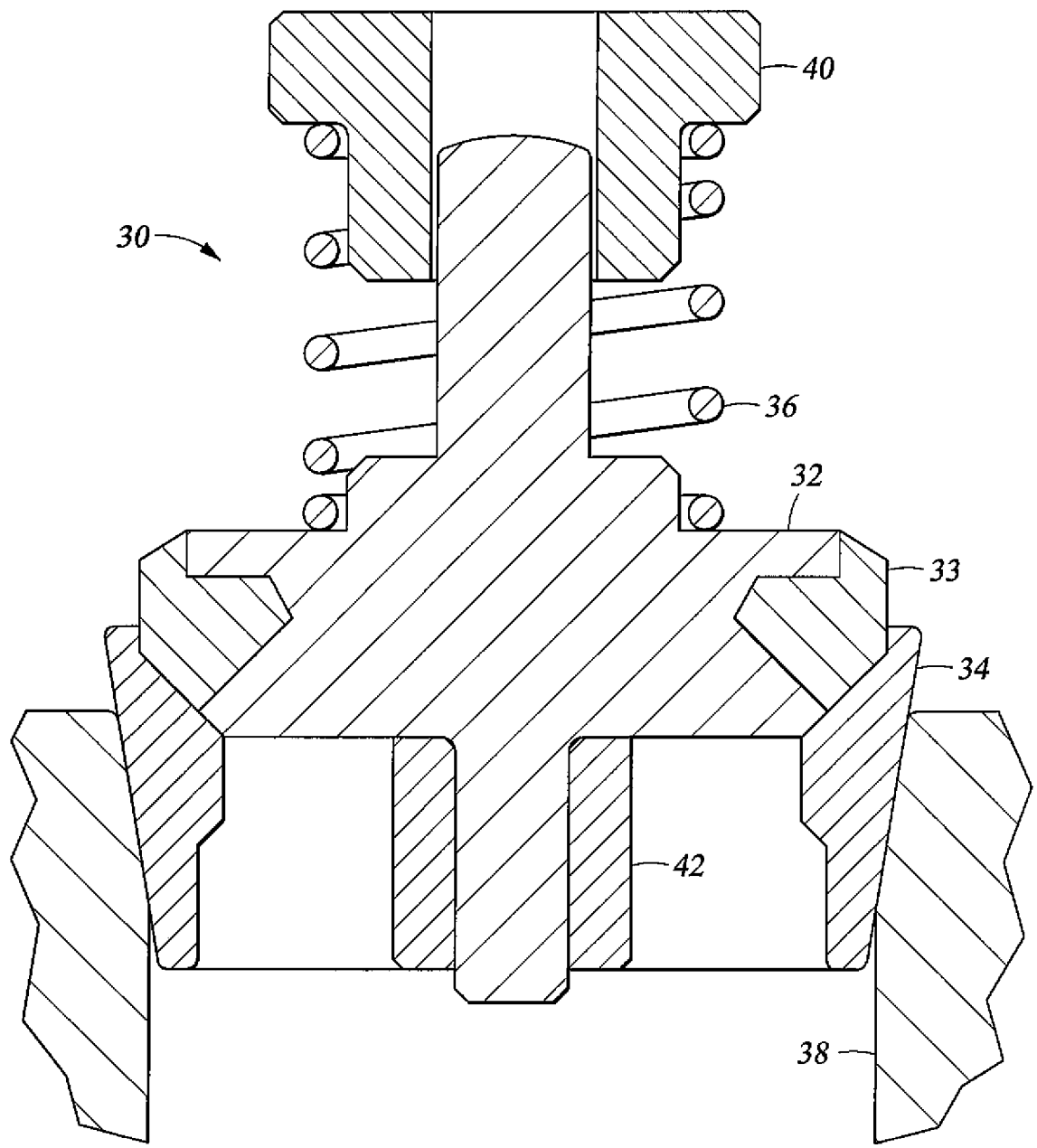
FIG. 2 is a cross-sectional elevation view of a prior art valve assembly.

Referring now to FIG. 2, valve assembly 30 comprises closure member 32, insert 33, sealing member 34, biasing member 36, sealing member housing 38, biasing member seat 40, and closure member guide 42. In the embodiment shown in FIG. 2, biasing member 36 is a coiled spring which contacts closure member 32. Because biasing member 36 is biased against closure member 32, biasing member 36 remains in contact with closure member 32 if closure member 32 is in the closed position (shown in FIG. 2) or in the open position (not shown). A frictional force between biasing member 36 and closure member 32 resists relative movement between biasing member 36 and closure member 32. This frictional force makes it difficult for closure member 32 to rotate relative to biasing member 36.

In the embodiment shown in FIG. 2, biasing member 36 is also in contact with biasing member seat 40. A frictional force between biasing member 36 and biasing member seat 40 resists relative movement between biasing member 36 and biasing member seat 40. This frictional force therefore makes it difficult for biasing member 30 to rotate relative to biasing member seat 40. In prior art valves, the frictional forces at each end of biasing member 36 reduces the tendency for either biasing member 36 or closure member 32 to rotate relative to biasing member seat 40. In addition, sealing member 34 also does not rotate during valve operation because it is secured to sealing member housing 38. As a result, closure member 32 does not rotate relative to sealing member 34. This causes insert 33 to strike sealing member 34 in the same, or nearly the same, rotational position during repetitive opening and closing valve cycles. This causes insert 33 and sealing member 34 to wear and deteriorate until the fluid leakage rate becomes so high that the ability to maintain the proper pressure is lost. When this occurs, the pump must be shut down for maintenance and insert 33 and sealing member 34 must be repaired or replaced. This leads to increased costs due to equipment downtime and maintenance expenses.

Figure 3:
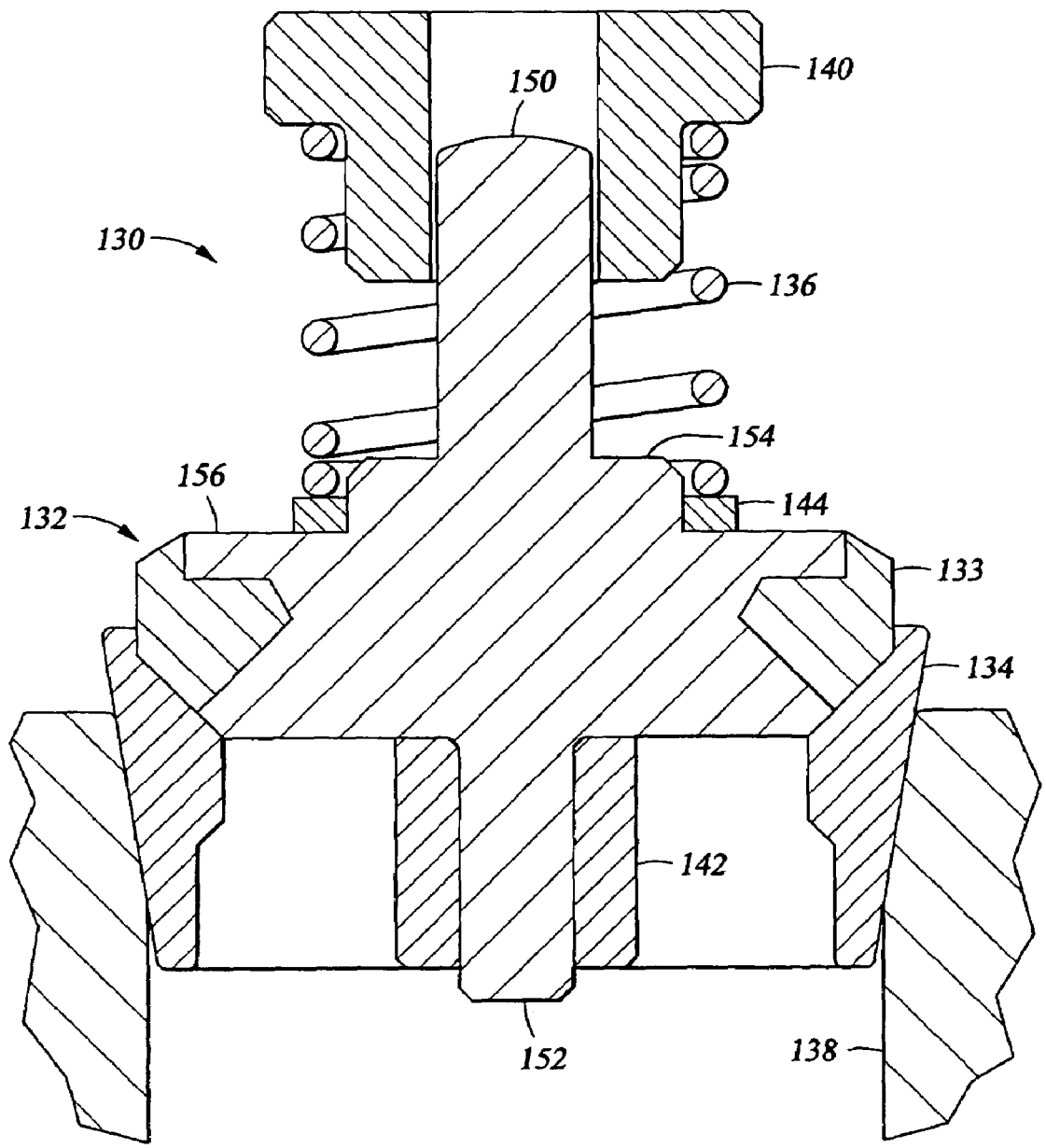
FIG. 3 is a cross-sectional elevation view of a valve assembly constructed in accordance with embodiments of the invention.
Figure 4:
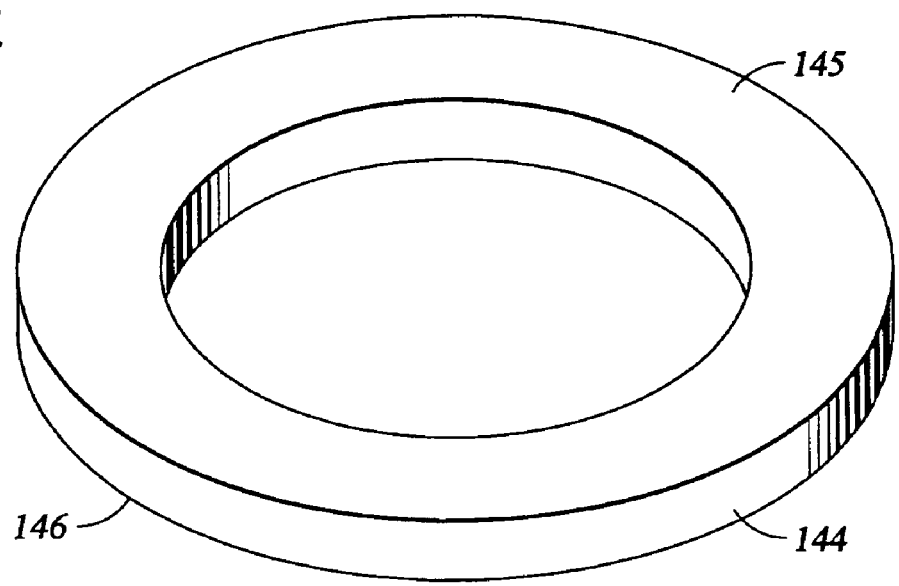
FIG. 4 is a perspective view of an anti-friction ring constructed in accordance with embodiments of the invention.

Referring now to FIG. 3, valve assembly 130 is depicted in accordance with embodiments of the invention. Valve assembly 130 comprises closure member 132, sealing member 134, biasing member 136, sealing member housing 138, biasing member seat 140, closure member guide 142 and anti-friction ring 144. Closure member 132 comprises first stem 150, second stem 152, insert 133, shoulder portion 154 and disc portion 156. In preferred embodiments, anti-friction ring 144 is comprised of a material with a low coefficient of friction and good lubricity. Examples of such materials include nylon or a polymer such as Delrin®. More specifically, anti-friction ring 144 may be comprised of nylon 6 or Delrin 500® in preferred embodiments. A perspective view of one embodiment of anti-friction ring is shown in FIG. 4. In the embodiment shown in FIG. 4, anti-friction ring 144 comprises a first surface 145 that contacts biasing member 136 and a second surface 146 that contacts closure member 132. The embodiment shown in FIG. 4 is constructed in a continuous ring configuration. In other embodiments (not shown), anti-friction ring 144 can comprise different configurations, such as a split ring, or a ring incorporating ball bearings or cylindrical rolling element bearings.

Referring back to FIG. 3, biasing member 136 and closure member 132 are typically constructed of metal and generally have poor surface finishes that increase the frictional forces when they contact each other. However, by placing anti-friction ring 144 between biasing member 136 and closure member 132, the friction is reduced as compared to the frictional forces created by the metal-to-metal contact when anti-friction ring 144 is not present. In preferred embodiments, anti-friction ring 144 is made from a material which has a lower coefficient of friction than biasing member 136 and closure member 132. Anti-friction ring 144 therefore decreases the resistance to the rotation of closure member 132. In addition, disc portion 156 can be machined or polished in the area that contacts anti-friction ring 144, further reducing the resistance to rotation of closure member 132. This allows closure member 132 to more freely rotate, thereby permitting insert 133 to strike sealing member 134 in different rotational positions during repetitive cycling of valve assembly 130.

Figure 6:
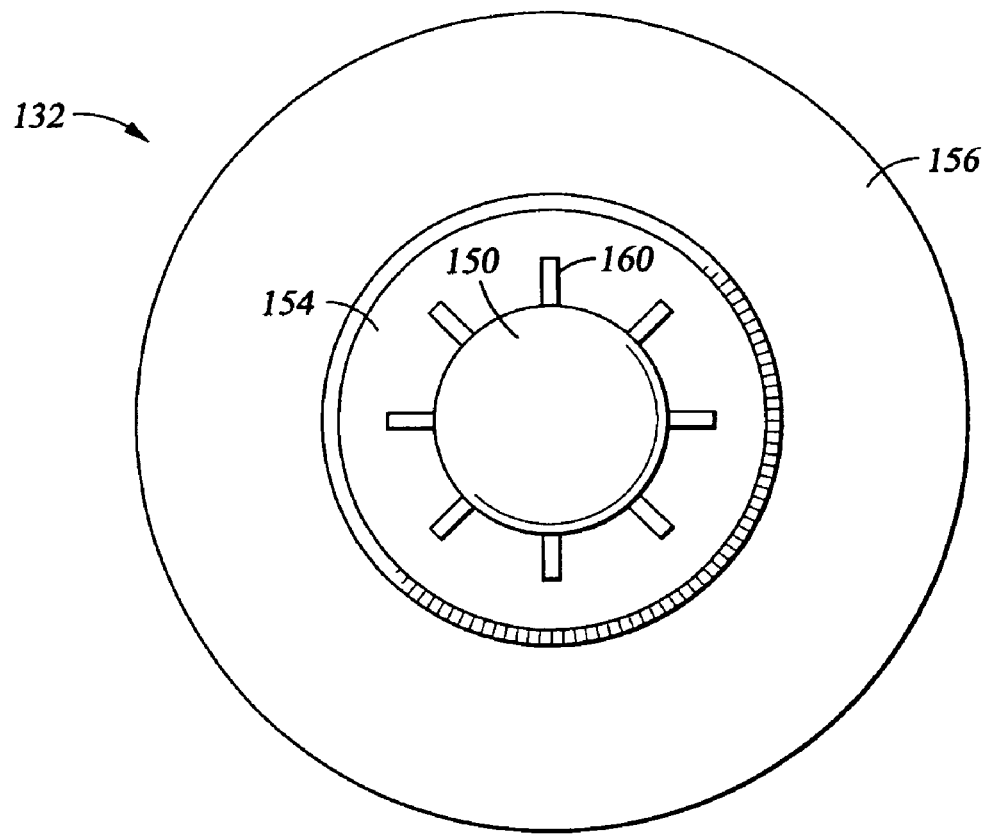
FIG. 6 is a top view of a closure member constructed in accordance with embodiments of the invention.
Figure 5:
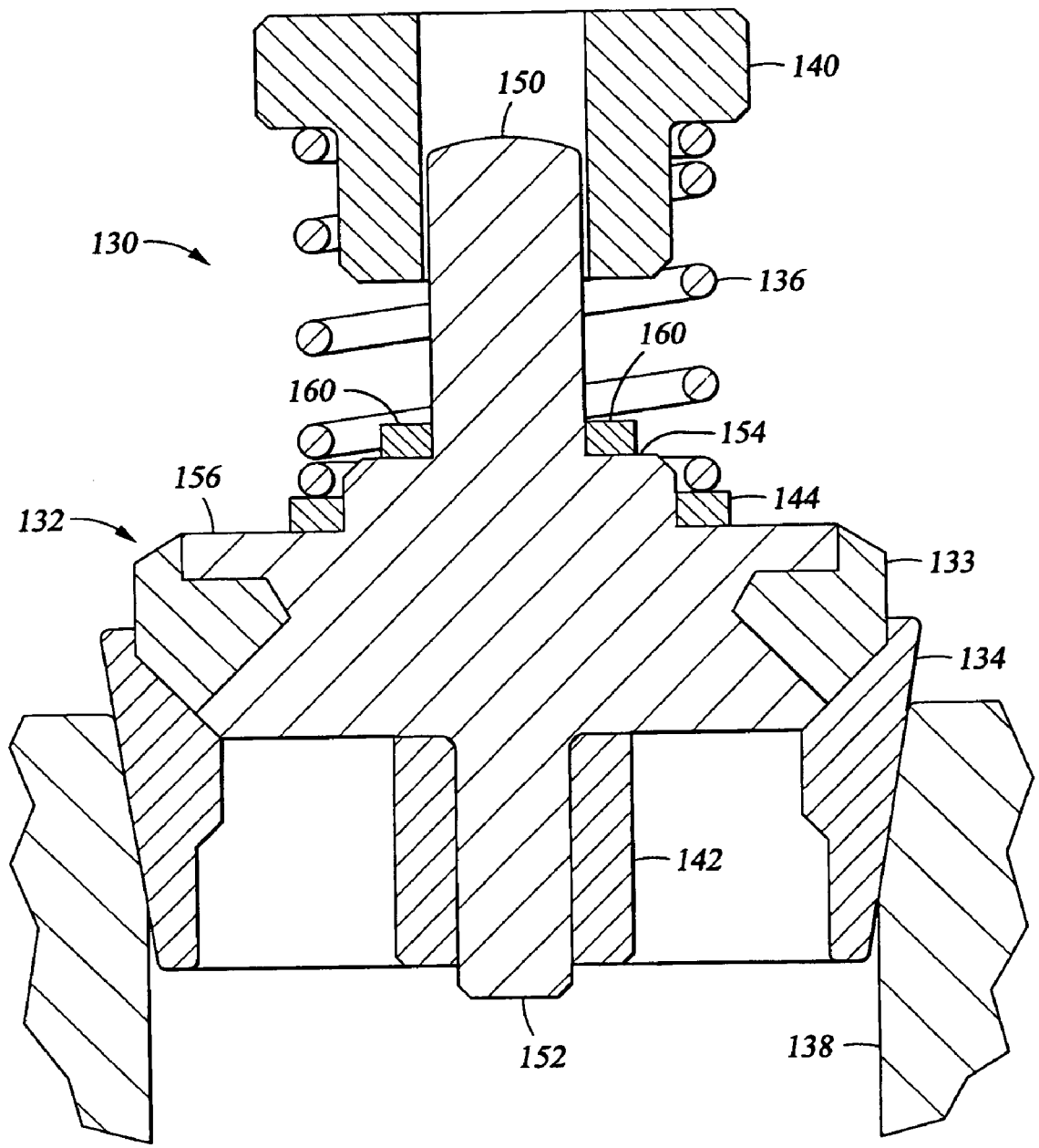
FIG. 5 is a cross-sectional elevation view of a valve assembly constructed in accordance with embodiments of the invention.

Due to the configuration of valve assembly 130, fluid flow will not be evenly distributed around closure member 132. Therefore, fluid flow during operation of valve assembly 130 will provide a rotational force to closure member 132. As shown in the embodiment in FIGS. 5 and 6, a plurality of vanes 160 may also be added to closure member 132 to increase the rotational force imparted on closure member 132 by the fluid flow. A top view of closure member 132 is shown in FIG. 6, depicting a plurality of eight vanes 160 coupled to first stem 150, but other embodiments may comprise a different number or configuration of vanes. In other embodiments (not shown) vanes may be coupled to shoulder portion 154 or disc portion 156. If additional rotational force is needed, an external drive mechanism such as electric motor (not shown) may also be coupled to closure member 132. With closure member 132 able to rotate, insert 133 and sealing member 134 will have a decreased wear rate and increased service life as compared to prior art valve assemblies under similar operating conditions. This will result in reduced operating costs and increased reliability for valve assembly 130.

Figure 7:
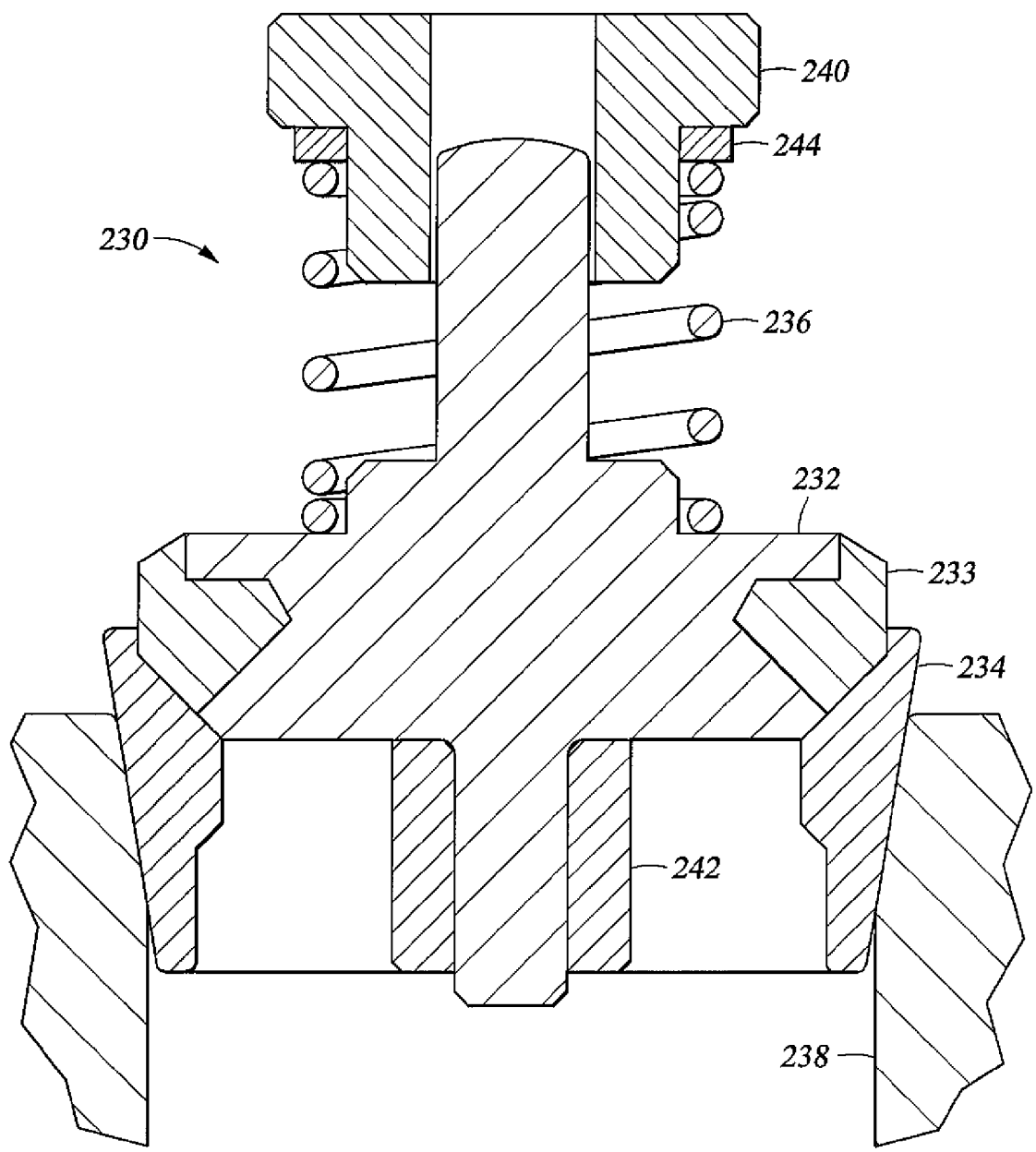
FIG. 7 is a cross-sectional elevation view of a valve assembly constructed in accordance with embodiments of the invention.

In an alternative embodiment shown in FIG. 7, anti-friction ring 244 is placed between biasing member 236 and biasing member seat 240. The same principles of operation described in the embodiment of FIG. 4 are employed in this embodiment to allow closure member 232 to rotate relative to sealing member 234. However, in the embodiment of FIG. 7 the relative rotation is primarily between biasing member 236 and biasing member seat 240, rather than between biasing member 236 and closure member 232. The low coefficient of friction provided by anti-friction ring 244 allows biasing member 236 to rotate relative to biasing member seat 240. In addition, biasing member seat 240 may be machined or polished in the area that contacts anti-friction ring 244, further reducing the resistance to rotation of biasing member 236. The relatively high coefficient friction between biasing member 236 and closure member 232 (which do not have an anti-rotation ring between them) allows biasing member 236 and closure member 232 to rotate as one unit. This permits insert 233 to strike sealing member 234 in different rotational positions during repetitive cycling of valve assembly 230. A plurality of vanes or external drive mechanism (not shown) may also be added to the embodiment shown in FIG. 7 to increase the rotational force if desired.

While preferred embodiments of this invention have been shown and described, modifications thereof can be made by one skilled in the art without departing from the scope or teaching of this invention. The embodiments described herein are exemplary only and are not limiting. Many variations and modifications of the system and apparatus are possible and are within the scope of the invention. For example, the relative dimensions of various parts, the materials from which the various parts are made, and other parameters can be varied, so long as the anti-friction ring apparatus retains the advantages discussed herein. In addition, use of the term "between" when describing the location of a component should not be construed such that the component must be directly contacting the adjacent members. Accordingly, the scope of protection is not limited to the embodiments described herein, but is only limited by the claims that follow, the scope of which shall include all equivalents of the subject matter of the claims.

What is claimed is:

1. A valve assembly for a pump used to pump abrasive fluid comprising:
   a biasing member;
   a closure member having a first coefficient of friction;
   a sealing member, wherein said biasing member biases said closure member towards said sealing member; and
   an anti-friction ring having a second coefficient of friction less than said first coefficient of friction between said closure member and said biasing member.

2. The valve assembly of claim 1, wherein said anti-friction ring is comprised of nylon.

3. The valve assembly of claim 1, wherein said anti-friction ring is comprised of polymer.

4. The valve assembly of claim 1, wherein said closure member comprises vanes.

5. The valve assembly of claim t, wherein said biasing member is a spring and said closure member comprises a disc portion.

6. The valve assembly of claim 1, wherein said biasing member has a third coefficient of friction that is greater than said second coefficient of friction.

7. The valve assembly of claim 1, wherein said closure member includes a polished disc portion engaging said anti-friction ring.

8. A valve assembly for a pump used to pump abrasive fluid comprising:
- a biasing member seat having a first coefficient of friction;
- a biasing member having a second coefficient of friction;
- a closure member;
- a sealing member, wherein said biasing member biases said closure member towards said sealing member; and
- an anti-friction ring between said biasing member seat and said biasing member, said anti-friction ring having a third coefficient that is less than said first coefficient of friction and less than said second coefficient of friction.

9. The valve assembly of claim 8, wherein said anti-friction ring is comprised of nylon.

10. The valve assembly of claim 8, wherein said anti-friction ring is comprised of polymer.

11. The valve assembly of claim 8, wherein said closure member comprises vanes.

12. The valve assembly of claim 8, wherein said biasing member is a spring and said closure member comprises a disc portion.

13. The valve assembly of claim 8, wherein said biasing member scat includes an engaging surface contacting said biasing member, said engaging surface being polished.

14. A valve assembly for a pump used to pump abrasive fluid comprising:
- a biasing member having a first coefficient of friction;
- a closure member;
- a sealing member, wherein said biasing member biases said closure member towards said sealing member and said closure member rotates relative to said sealing member; and
- an anti-friction ring disposed adjacent an end of said biasing member and having a second coefficient of friction less than said first coefficient of friction.

15. The valve assembly of claim 14, wherein said closure member has a third coefficient of friction greater than said second coefficient of friction.

16. The valve assembly of claim 15, wherein the anti-friction ring is disposed between said closure member and said biasing member.

17. The valve assembly of claim 13, further comprising a biasing member seat.

18. The valve assembly of claim 17, wherein said biasing member seat has a third coefficient of friction greater than said second coefficient of friction.

19. The valve assembly of claim 18, wherein the anti-friction ring is disposed between said biasing member seat and said biasing member.

20. The valve assembly of claim 14, wherein said biasing member is a spring.

* * * * *